Aug. 28, 1962    R. L. SCOTT    3,051,153
FUEL CONVERTER
Filed Aug. 3, 1961
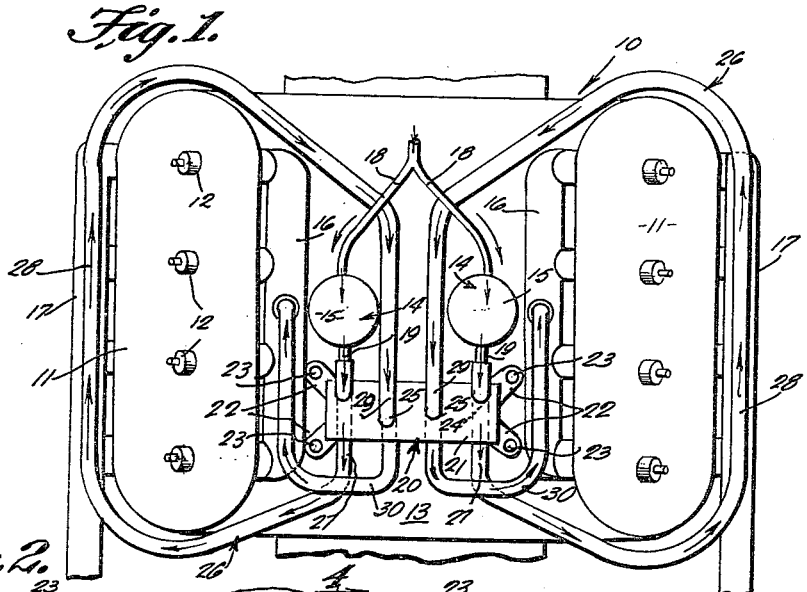
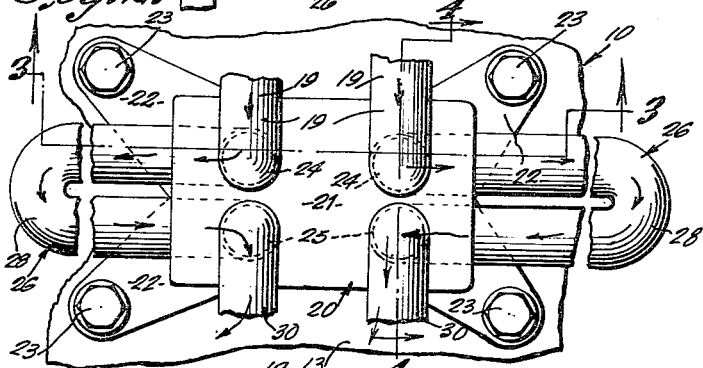
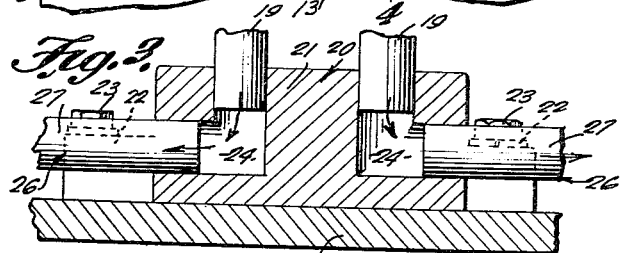
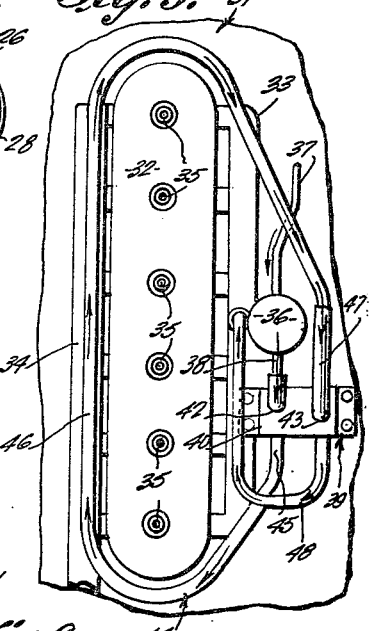
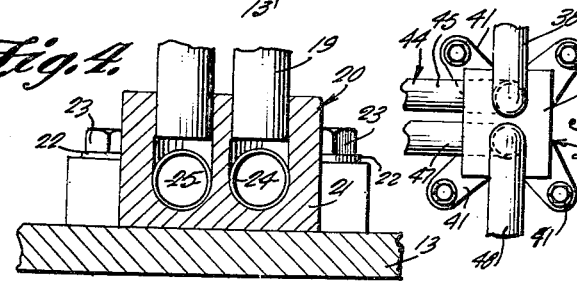
INVENTOR.
Robert Lee Scott
BY
Victor J. Evans & Co.
Attorneys

United States Patent Office 3,051,153
Patented Aug. 28, 1962

3,051,153
FUEL CONVERTER
Robert Lee Scott, P.O. Box 846, Bishop, Tex.
Filed Aug. 3, 1961, Ser. No. 129,085
2 Claims. (Cl. 123—122)

The present invention relates to an internal combustion engine, and more particularly to a fuel converter for an internal combustion engine.

The primary object of the present invention is to provide a fuel converter which is adapted to be used for increasing the efficiency of an internal combustion engine and wherein according to the present invention damp or wet fuel is converted into a hot and dry fuel in order to permit the engine to operate with maximum efficiency and economy.

Another object of the present invention is to provide a fuel converter which will increase mileage per gallon of fuel such as gasoline, as for example when the fuel converter is used in conjunction with an internal combustion engine on a vehicle, and wherein the fuel converter of the present invention will also help increase combustion efficiency.

Another object of the present invention is to provide a device of the character described that is rugged in structure and foolproof in operation, and wherein the fuel converter of the present invention is economical to manufacture and efficient in use.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is a diagrammatic or schematic top plan view showing an eight cylinder V-type engine with a two barreled carburetor and illustrated in the present invention in conjunction therewith.

FIGURE 2 is a top plan view of the fuel converter of the present invention and showing portions of the cylinder blocks broken away.

FIGURE 3 is a sectional view taken on the line 3—3 of FIGURE 2.

FIGURE 4 is a sectional view taken on the line 4—4 of FIGURE 2.

FIGURE 5 is a diagrammatic top plan view similar to FIGURE 1 but illustrating a modification wherein the fuel converter is shown used with a six cylinder engine having one carburetor and one intake manifold and one exhaust manifold.

FIGURE 6 is a fragmentary top plan view showing the fuel converter of FIGURE 5.

Referring in detail to the drawings, and more particularly to FIGURES 1 through 4 of the drawings, the numeral 10 indicates a V-type engine of conventional construction which includes the usual pair of cylinder blocks 11, and the numeral 12 indicates portions of the spark plugs, and a support portion 13 extends between the cylinder blocks 11 in the usual manner. There is further provided a carburetor mechanism which is indicated generally by the numeral 14, and the carburetor mechanism 14 may include two barrels 15 which are illustrated schematically or diagrammatically in FIGURE 1. The numerals 16 indicate the intake manifolds for the cylinder blocks 11, and there is further provided the exhaust manifold 17 for the cylinder blocks 11.

As shown in the drawings, inlet lines 18 are adapted to convey or supply fuel such as gasoline and a suitable source of supply such as the fuel tank of a vehicle to the carburetor barrels 15, and the numeral 19 indicates outlet lines that are connected to the barrels 15, FIGURE 1.

According to the present invention there is provided a fuel converter which is indicated generally by the numeral 20. The fuel converter 20 comprises a body member 21 which has a plurality of spaced apart lugs or ears 22 secured thereto or formed integral therewith, and these lugs 22 are provided with apertures or openings for the projection therethrough of securing elements such as the bolts 23, and the bolts 23 may engage the support portion 13 whereby the fuel converter 20 will be maintained in place on the internal combustion engine 10.

The body member 21 is provided with first and second pairs of ports or L-shaped passageways, as for example they are two pairs of first and second L-shaped passageways which are indicated by the numerals 24 and 25, for a purpose to be later described.

The numeral 26 indicates a conduit which has an end portion 27 communicating with a passageway 24, and the outlet line 19 communicates with the opposite end of the passageway 24 from the conduit portion 27. The conduit 26 further includes a portion 28 which is arranged in juxtaposition for heat exchange contiguous relation with respect to the exhaust manifold 17, and the conduit 26 further includes an end portion 29 which communicates with an end of the corresponding passageway 25. The numeral 30 indicates a line which has one end communicating with the opposite end of the passageway 25 from the conduit portion 29, and the line 30 has another end connected to the intake manifold 16 of the engine.

Attention is now directed to FIGURES 5 and 6 wherein there is illustrated a modification and wherein in FIGURES 5 and 6 the numeral 31 indicates a portion of a conventional internal combustion engine such as a six cylinder engine, and the engine 31 of FIGURES 5 and 6 includes the usual cylinder blocks 32 as well as an intake manifold 33 and an exhaust manifold 34, and the numeral 35 indicates portions of the spark plugs for the engine 31. There is further provided a single carburetor 36, and the numeral 37 indicates an intake line which is adapted to connect the carburetor 36 to a source of supply of fuel, such as the gasoline tank of said automobiles, trucks, bus or the like. An outline line 38 connects the carburetor 36 to one end of an L-shaped passageway 42 in the body member 40 of the fuel converter 39, and the fuel converter 39 has apertured lugs 41 affixed thereto whereby securing elements such as bolts 23 can be extended through said apertured lugs 41 in order to anchor or fasten the fuel converter in place on the engine 31.

The body member 40 of the fuel converter 39 is provided with first and second L-shaped passageways 42 and 43 which have a construction and function generally similar to the previously described passageways 24 and 25.

The numeral 44 indicates a conduit which has an end portion 45 connected to the opposite end of the passageway 42 from the line 38, and the conduit 44 includes a portion 46 which is arranged in juxtaposition for a heat exchange contiguous relation with respect to the engine exhaust manifold 34, and the conduit 44 also has an end portion 47 which communicates with an end of the passageway 43. The numeral 48 indicates a line which connects the passageway 43 to the intake manifold 33 of the engine 31.

From the foregoing, it is apparent that there has been provided a fuel converter, and in use with the parts arranged as shown in the drawings and in particular as shown in FIGURES 1 through 4 of the drawings, it will be seen that the fuel converter 20 can be used with an internal combustion engine 10 which may be of the V-type and with the parts arranged as shown in FIGURES 1 through 4, it will be seen that fuel such as gasoline is adapted to be conveyed from the fuel tank through the lines 18 to the carburetor barrels 15, and then the fuel passes through the lines 19 and then through the passageways 24 into the end portions 27 of the conduits 26, and as the fuel passes through the sections or portions 28 of the conduits 26, heat from the exhaust manifold 17 will heat the fuel passing through the conduit portion 28 so that the fuel will be converted from a damp cold state to a warm dry condition due to the heat exchange arrangement between the exhaust manifold 17 and the conduit section 28, and this heated fuel will then flow out through the end portion 29 of the conduit and enter the passageway 25. From the passageway 25 the fuel will flow through the line 30 into the intake manifold 16 whereby it will be seen that the fuel which enters the intake manifold 16 will be in a heated dry condition so as to permit the engine to operate with maximum efficiency and wherein increased mileage of a vehicle will be provided for.

In view of the fact that the fuel converter 20 is shown being used with a V-type engine 10 in FIGURES 1 through 4, it will be seen that there is a pair of passageways 24 and 25, that is there are two similar arrangements in order to permit the fuel conversion to take place for each intake manifold 16. The fuel converter includes a body member which provides an anchoring means for the various conduits or lines so that these lines will be held in their proper place, and wherein the lines or conduits can be held or arranged whereby the necessary and desired heat exchange can take place. In addition the body member 21 is anchored in place as for example to the support portion 13 of the engine by means of the securing element 23.

Instead of using the fuel converter 20, a fuel converter such as the fuel converter 39 of FIGURES 5 and 6 can be used as for example when a six cylinder engine 31 is being utilized. The fuel converter 39 generally functions in the same manner as the previously described fuel converter 20. However, the fuel converter 39 has only one pair of passageways 42 and 43 instead of the two pairs of passageways previously described in connection with the fuel converter 20. The converter 39 includes the body member 40 which is suitably secured in place to a convenient portion of the engine 31, and with the parts arranged as shown in FIGURES 5 and 6, it will be seen that fuel is adapted to be supplied from the fuel tank to the carburetor 36, and this fuel then flows through the line 38 and then through the passageway 42 out through the end portion 45 of the conduit 44. The damp cold fuel flowing into the conduit 44 is heated as the fuel passes through the portion 46 of the conduit 44, since the portion 46 is arranged contiguous to the exhaust manifold 34, and as this fuel flows through the portion 46 it will be converted to a condition or state so that it will permit the engine to operate with maximum efficiency. The fuel leaves the conduit 44 through the end portion 47 and then flows through the passageway 43, and the converted fuel is then conveyed through the line 48 to the intake manifold 33 of the engine 31.

The parts can be made of any suitable material and in different shapes or sizes.

It is to be noted that with the parts arranged as shown in the drawings, the fuel flows from the fuel tank to the carburetor, where the correct amount of fuel and air are metered through the carburetor and drawn into the proper opening or passageway and then through the conduit and then eventually the fuel is discharged into the intake manifold. The wet fuel which is metered through the carburetor is pulled through the lines or conduits into the intake manifold by the vacuum of the engine, and the wet fuel is atomized and converted into a hot dry gas by the heat from the exhaust manifold over which a portion of the conduit passes.

The fuel converter of the present invention is especially suitable for use with an internal combustion engine and the fuel converter serves to convert the damp or wet fuel from the carburetor to a hot dry fuel by heat from the engine and exhaust manifold. The fuel converter may be made of metal and interposed between the carburetor and the intake manifold of the engine. The fuel is metered through the carburetor in the regular manner and by the vacuum of the engine it is pulled through the lines or conduits and the fuel is discharged into the intake manifold. The conduit or conduits are of sufficient length to have a portion thereof which extends over the exhaust manifold, whereby the heat from the engine in the exhaust manifold will convert the damp or wet fuel as it passes through this portion of the conduit into a hot, dry fuel which in turn increases the efficiency of the combustion of the fuel injected into the engine. This provides a more efficient operation of the engine by burning more of the fuel that is drawn into the combustion chamber of the engine so as to leave less unburned residue to pass by the piston rings and contaminate the oil in the crankcase of the engine or be discharged into the atmosphere through the exhaust pipe of the engine.

The body member of the fuel converter that fits between the carburetor and intake manifold is of sufficient thickness to permit the boring of the openings or passageways therein, and these passageways as well as the conduits and lines are of a sufficient diameter or size so as to permit the proper amount of air and fuel to pass therethrough, after the air and fuel have been metered through the carburetor for the efficient operation of the engine on which it is mounted.

The present invention can be built into and a part of either the intake manifold, or the carburetors of future manufacture.

FIGURES 1 through 4 show the device being used on a V-type engine with a two barreled carburetor, but the present invention is adapted to be used on any type of gasoline internal combustion engine. For example FIGURES 5 and 6 illustrate the use of a fuel converter on an engine with one exhaust manifold, and a single barreled carburetor, and in FIGURES 5 and 6 only one passageway 42 and one passageway or opening 43 is needed, and only one conduit 44 is needed and the conduit 44 is of a sufficient length so that a portion 46 thereof extends over the engine exhaust manifold 34.

The primary purpose of the present invention is to increase the efficiency of an internal combustion gasoline engine by converting the damp or wet fuel into a hot and dry fuel. For example an automobile equipped with a V-type engine using the fuel converter of the present invention between the intake manifold and a two barreled carburetor is adapted to be used for permitting a considerable increase in miles per gallon whether the vehicle is being operated in stop and go city driving, or highway travel. In addition combustion efficiency of the engine is appreciably increased when using the fuel converter of the present invention.

Minor changes in shape, size and rearrangement of details coming within the scope of invention claimed may be resorted to in actual practice, if desired.

What is claimed is:

1. In a V-type engine which includes a pair of cylinder blocks, a support portion extending between said cylinder blocks, intake and exhaust manifolds for said blocks, a carburetor mechanism including two barrels, inlet lines connected to said barrels for conveying fuel from a source of supply of fuel to said barrels, outlet lines connected to said barrels; a fuel converter comprising a body member interposed between said cylinder blocks, spaced apart apertured lugs affixed to said body member, securing elements extending through said apertured lugs and connected to said support portion, there being pairs of first and second passageways in said body member and said first passageways communicating with said outlet lines, conduits having end portions thereof communicating with said first passageways and said conduits having portions thereof arranged in contiguous heat exchange relation with respect to said exhaust manifolds, the other ends of the conduits communicating with said second passageways, and lines connecting said second passageways to said intake manifolds.

2. In an internal combustion engine having a cylindrical block, an intake manifold and an exhaust manifold, a carburetor, an inlet line for connecting said carburetor to a source of supply of fuel, an outlet line connected to said carburetor; a fuel converter comprising a body member having apertured lugs affixed to said engine, there being first and second spaced apart L-shaped passageways in said body member, said outlet line being connected to one end of said first passageway, a conduit having an end portion connected to the other end of said first passageway, and said conduit having a portion thereof arranged in juxtaposition heat exchange relationship with respect to said exhaust manifold, and said conduit being connected to an end of said second passageway, and a line connecting said second passageway to said intake manifold.

References Cited in the file of this patent
UNITED STATES PATENTS 2,261,446  Ormsby _____ Nov. 4, 1941